United States Patent [19]
Hanley, IV et al.

[11] Patent Number: 6,150,428
[45] Date of Patent: Nov. 21, 2000

[54] EXPANSION TEMPERATURE TOLERANT DRY EXPANDABLE SEALANT AND BAFFLE PRODUCT AND METHOD OF PREPARING SAME

[75] Inventors: John L. Hanley, IV, Sterling Heights, Mich.; Norman E. Blank, Wayne, N.J.

[73] Assignee: Sika Corporation, Lyndhurst, N.J.

[21] Appl. No.: 09/407,820

[22] Filed: Sep. 28, 1999

[51] Int. Cl.$^7$ ........................................... C08J 9/00
[52] U.S. Cl. ............................................ 521/135; 521/178
[58] Field of Search ................................. 521/135; 11/178

[56] References Cited

U.S. PATENT DOCUMENTS

| | | |
|---|---|---|
| 5,266,133 | 11/1993 | Hanley . |
| 5,373,027 | 12/1994 | Hanley et al. . |
| 5,462,975 | 10/1995 | Yamamoto et al. ..................... 521/135 |
| 5,506,025 | 4/1996 | Otto et al. . |

FOREIGN PATENT DOCUMENTS

WO 9300381  1/1993  WIPO .

*Primary Examiner*—Morton Foelak
*Attorney, Agent, or Firm*—Hovey, Williams, Timmons & Collins

[57] ABSTRACT

An expansion temperature tolerant, dry, expandable sealant and baffle is provided which is capable of undergoing a desired degree of full expansion when an automobile body containing the sealant and baffle product is conveyed through a conventional bake and/or curing oven. The sealant and baffle product is fully expandable over a wider temperature and time range than heretofore available expandable baffle products. The composition for preparation of a molded expandable sealant and baffle component includes a grafted anhydride polymer, an epoxide terminated additive polymer which are capable of reacting with the grafted anhydride polymer and a blowing agent. The anhydride polymer and the epoxide terminated polymer react to a limited degree in the absence of a catalyst when the baffle product is heated in the bake and/or curing oven, thus providing an improved networked and bridged backbone polymer which effectively entraps gas emanating from the blowing agent, without adversely affecting the flexibility and expansion characteristics of the sealant baffles.

4 Claims, 1 Drawing Sheet

U.S. Patent  Nov. 21, 2000  6,150,428
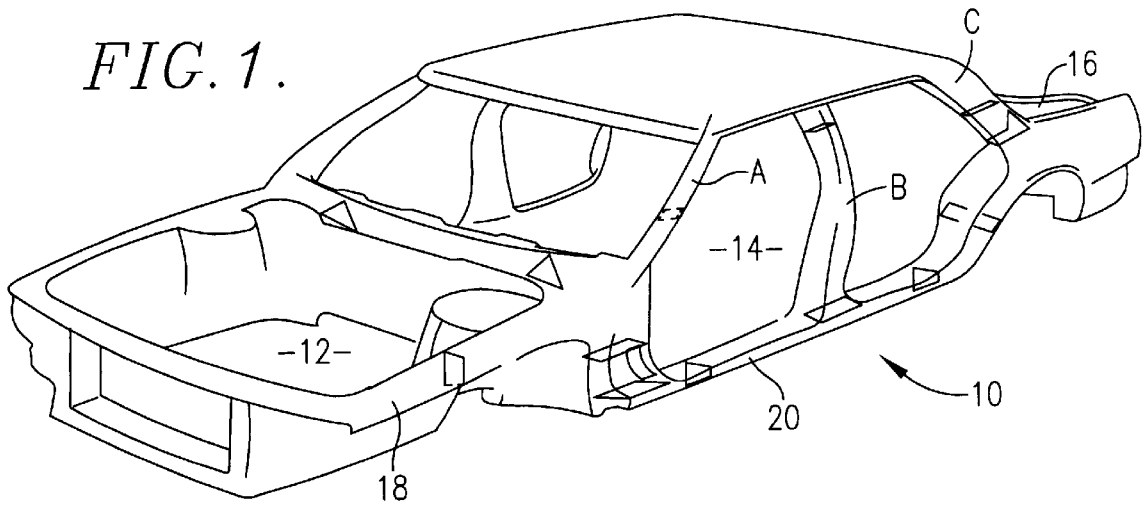
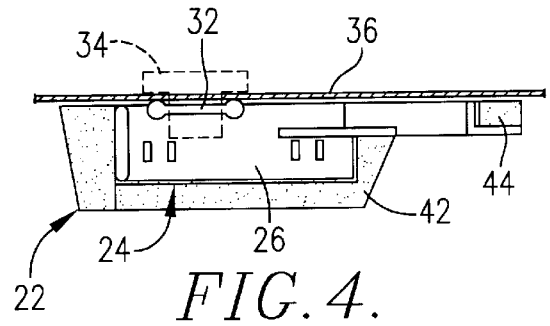
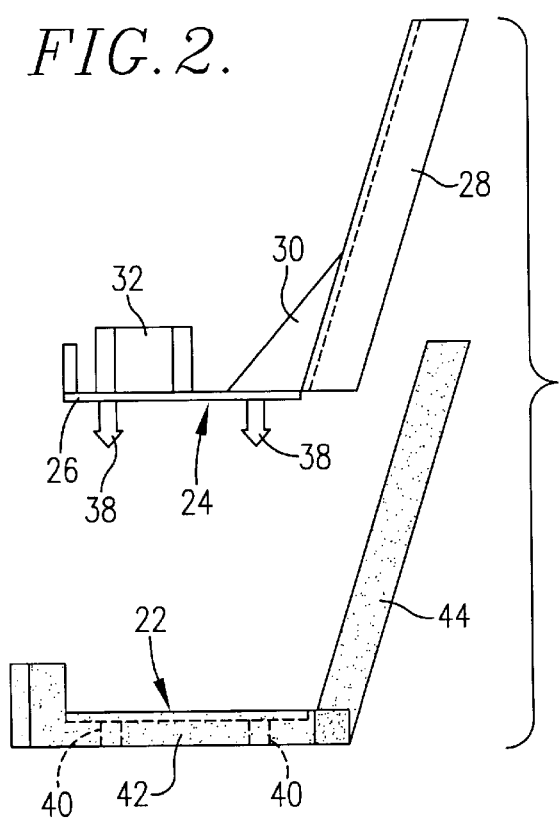
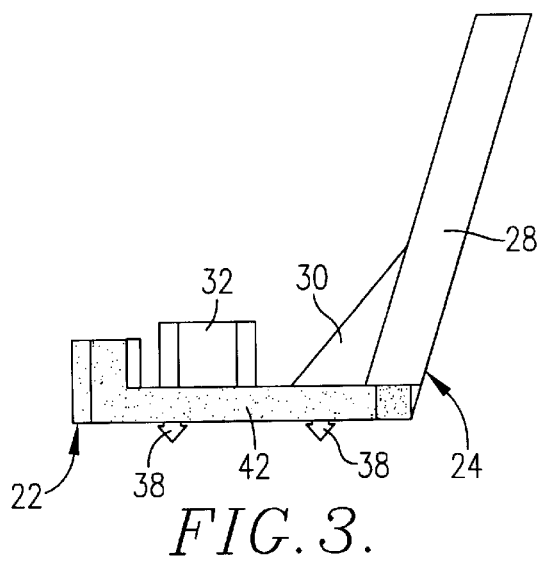

EXPANSION TEMPERATURE TOLERANT DRY EXPANDABLE SEALANT AND BAFFLE PRODUCT AND METHOD OF PREPARING SAME

BACKGROUND OF THE INVENTION

1. Field of the Invention.

This invention relates to an expansion temperature tolerant, dry, initially non-tacky, expandable sealant and acoustic baffle component for sealing an automobile body cavity and which is capable of undergoing expansion and becoming tacky at a temperature experienced by the automobile body cavity during oven curing of primers, sealers, and top coat applied to the vehicle. It also concerns an improved composition for forming an expandable sealant and acoustic baffle component which is capable of undergoing a desired degree of full expansion over a wider temperature range than has heretofore been the case. The invention in certain embodiments involves a sealant and acoustic baffle component of desired characteristics which also has improved structural integrity to provide added reinforcement for the cavity-defining structure of the vehicle body. The invention also relates to a novel method for preparing an expandable sealant and acoustic baffle component composition on a continuous processing basis, thus reducing the variability often observed with "batch type" processing.

2. Discussion of the Prior Art

Automotive vehicle bodies have a variety of hollow posts, cavities, passages and similar areas which can transmit undesirable noises, air currents, moisture, dust and other airborne particulates unless sealed to prevent infiltration of such sounds or contaminants. U.S. Pat. No. 5,373,027, issued to the assignee hereof, describes a dry, initially non-tacky, heat expandable sealant and baffle component which may be formed into a desired shape so that upon insertion into post, cavity or passage of the vehicle body, the component will undergo heat-induced expansion when the vehicle body is conveyed through a baking oven forming a part of the primer or paint curing step of the automobile manufacturing process.

In accordance with the '027 patent, the composition for preparing the dry, expandable sealant and baffle product includes a major amount of an ethylene-α,β ethylenically unsaturated carboxylic acid copolymer which has been partially neutralized with a metallic ion such as zinc, a minor amount of a blowing agent such as a modified azodicarbonamide and a minor amount of a low molecular weight resin tacifier which has the property of imparting tackiness to the outer surface of the component when the latter is raised to an elevated temperature and thereby expanded by the blowing agent.

The constituents of the composition for preparation of the dry, expandable sealant and baffle component are functional to form an expanded shape within the cavity of the automobile body when it is conveyed through a conventional paint or primer bake oven. Conventional ovens for baking or curing a finish applied to an automobile body typically operated at temperatures in the range of about 140° C. to about 200° C., depending upon the coating to be dried and cured. The automobile body usually transits a particular baking oven in a time period of from about 10 to 15 minutes to as much as 2 hours. To that end, prior expandable baffle compositions have been formulated to preferably undergo expansion at a temperature of about 135° C. to about 185° C. The dry, expandable sealant composition and product of the '027 patent has enjoyed substantial commercial success throughout the automotive manufacturing field. Recent popularity of expanded-in-place sealant and baffle products for automotive applications has been accelerated by the ease of use of the baffle elements and the fact that each can be appropriately sized and configured to custom fit specific body cavity areas. Furthermore, the fact that baffle expansion can be accomplished in situ while an automobile is passing through a baking oven avoids the necessity of providing additional equipment and manufacturing operations for that specific purpose.

Not unexpectedly, the focus of the paint and/or primer baking process in automotive manufacturing procedures is to properly and efficiently cure the paint and/or primer coating that has been applied to the surface of the vehicle body. Processing time is of the essence in the manufacture of automobiles and similar vehicles, and therefore the residence time of a vehicle body in the paint and/or primer baking oven is carefully controlled to effect the required curing of the paint and/or the primer, in a minimum time. It is to be appreciated that because of the many different cavities and passages in an automobile body, both as to location, length, and relative distance from the surface of the body which is being treated with heat to bake the paint or primer, the actual temperature experienced in particular cavities and passages of the body during the paint and/or primer curing operation can vary significantly, with certain cavities and passages being either raised to substantially higher temperatures than other cavities or passages during the baking cycle, or not elevated to an adequate temperature to insure full expansion of an expandable baffle element.

Engineers select the most advantageous vehicle body cavity locations for expandable baffle elements based on the susceptibility of particular cavities to transmit undesirable sounds or contaminants. That baffle location selection normally does not take into account the differences in the degree of heating of the location during the baking or curing cycle. For example, in high metal mass areas, heat energy dissipates more rapidly than in low metal mass areas. Thus, the expandable baffle material does not reach a sufficiently high temperature level to effect required full expansion of the baffle product prior to exit of the automobile body from the baking and curing oven. On the other hand, other baffle product locations may result in overheating of the baffle material because of its proximity to the direct heat source, the nature of the cavity defining metal surrounding the expandable baffle material, or the remoteness of the cavity from the outside surface of the vehicle body. Upright pillars can exhibit a chimney effect that has a bearing on the temperature realized in the that body cavity zone.

Thus, formulation of a suitable dry expandable sealant and baffle product requires that a number of diverse and functionally disparate parameters and conditions be satisfied. The composition must be made up of economical constituents that can be processed in an efficient manner preferably using existing equipment. The composition must be readily formable into a self-sustaining body of predetermined size and shape. The body should be capable of undergoing a of expansion from its original size, and to expand substantially uniformly in all directions unless constrained from doing so by a carrier for the body, or by a suitable baffle structure associated with the body, in order to effectively seal the cavity. The body formed from the expandable composition must be essentially dry and non-tacky as formed for insertion in a specific cavity of the automobile body.

Most particularly, given the fact that different cavities in the vehicle body are raised to temperatures which differ from one cavity to another, the composition used to prepare the expandable sealant and baffle product must be capable of undergoing a high degree of expansion at even the lowest temperature likely to be experienced in a cavity in which an expandable part is positioned. Similarly, the expandable sealant and baffle product must not undergo carbonization and/or burning at the highest temperature that is likely to be experienced in one of the expandable part-receiving cavities during the vehicle paint and/or primer curing cycle.

In addition, the composition must be of a nature such that when formed into a expandable part for insertion in a vehicle body cavity to be cured in a paint or primer baking oven, the part has physical network-like characteristics which enhance entrapment of the gasses which are produced by the blowing agent which is incorporated into the formulation, thus assuring that the part undergoes a high degree of retained expansion in use.

It is also desirable that certain embodiments of the expandable sealant and baffle product have the functional property of providing additional structural reinforcement for the cavity-defining structure of the vehicle body, while retaining its noise, air and moisture barrier characteristics.

SUMMARY OF THE INVENTION

The present invention provides an expansion temperature tolerant, dry, initially non-tacky, expandable sealant and acoustic baffle component for sealing an automobile body cavity and which is formed of a composition capable of undergoing expansion and becoming tacky at substantially the full range of temperatures experienced by most if not all of the body cavities of the vehicle which prospectively would benefit from the presence of an expanded component in that cavity. Thus, the sealant and acoustic baffle product of this invention has a substantially wider time and temperature window than with previously available expandable products for the same application.

In particular, the invention concerns a unique expandable sealant and acoustic baffle component for a vehicle body cavity that may be preformed into a desired initial shape and which undergoes a relatively high degree of expansion when raised to a temperature normally experienced by a respective body cavity during the paint and/or primer baking cycle of an automobile manufacturing operation, substantially regardless of the location of the sealant and baffle component receiving cavity and notwithstanding the fact that the temperature in different body cavities may vary significantly from cavity to cavity throughout the extent of the vehicle body.

The composition is uniquely formulated in certain embodiments thereof to permit preparation from the composition of an initially dry, non-tacky, expandable when heated component, that serves to add structural rigidity to the wall structure of the vehicle body defining the cavity which receives the expandable component.

The composition utilized to prepare the expansion temperature tolerant, expandable sealant and acoustic baffle component contains a quantity of a grafted anhydride polymer. The polymer, even though initially non-tacky, has the desirable property of enhancing the tackiness and adhesiveness of the expanded component at a temperature within the full range experienced by body cavities of a vehicle during passage of the vehicle body through a paint and/or primer bake oven. Thus, an expandable component positioned within the vehicle body cavity will firmly adhere to the wall surface of the cavity as the component expands during curing of the paint and/or primer in the bake oven. Ethylene- vinyl acetate grafted with maleic anhydride is a preferred grafted anhydride polymer in the composition by virtue of the fact that it has a relatively low melt temperature of for example, less than about 120° C., which is below the temperature at which significant expansion of the expandable component takes place. Equally as important, the grafted EVA polymer retains its tack enhancing properties and desired viscosity characteristics without burning or charring at the maximum temperature experienced by the sealant and baffle receiving cavities of the vehicle during the paint and/or primer curing cycle.

The composition for preparing the dry, initially non-tacky, expandable component also includes a polymer additive containing a terminal epoxy group in which the epoxide moiety is capable of reacting with at least a part of the anhydride polymer at an elevated temperature sufficient to effect expansion of the sealant and acoustic baffle component. The of cross-linking reaction between the anhydride polymer and the epoxy polymer which occurs at the temperature to which the sealant and acoustic baffle component is subjected within the vehicle body cavity during paint and/or primer baking of the body creates a three-dimensional networked and bridged entity which during expansion of the component by a blowing agent incorporated therein serves to facilitate and increase the gas-retaining properties of the final expanded product. Contrary to prior conventional polymer practice, reaction of the epoxide terminated polymer with the grafted anhydride polymer is accomplished in the absence of a catalytic agent. As a consequence, adequate bridging and cross-linking of the polymers takes place to provide a cellular latticed product which efficiently entraps the gases emanating from the blowing agent, but the cross-linking and copolymer free radical polymerization between the two entities is not so pronounced as to significantly decrease the flexibility and expansion characteristics of a baffle product prepared from the sealant and baffle composition.

A dry, initially non-tacky, expandable sealant and acoustic baffle component may be prepared from a composition containing a grafted anhydride polymer which at its melt temperature enhances the tackiness of the expanded product, utilizing a batch mixing process. Batch mixing of a formulation containing a grafted anhydride polymer as a constituent produces a final product which can be expanded to a required degree when subjected to a temperature within the range found in an automotive paint and/or primer baking oven. However, attempts to prepare a composition from a formulation containing a grafted anhydride polymer using conventional continuous mixing equipment have been unsuccessful. Parts made of material prepared in a continuous mixer and cured at bake oven temperatures displayed a large degree of flow and poor expansion, resulting in a product that is not useful for the desired application.

It has now been unexpectedly discovered that by including a polymer having a terminal epoxide group, and a grafted anhydride polymer in the composition to be used in preparing an expansion temperature tolerant, dry, initially non-tacky, expandable sealant and acoustic baffle component, the composition may be processed by using a continuous-type mixer without deleteriously affecting the degree of expansion of a molded component from the composition when the molded, unexpanded product is subjected to baking oven level temperatures. The limited reaction between the grafted anhydride polymer and terminal epoxide polymer combination as the sealant and acoustic baffle component undergoes heat-induced expansion in the bake oven increases the body and melt viscosity of the component.

BRIEF DESCRIPTION OF THE DRAWINGS

FIG. 1 is a perspective view of an automobile body illustrating various pillars, engine rails and side body tubular structures which present body cavities that desirably include sealant and baffle components which effectively seal respective cavities against moisture, noise and particulate materials;

FIG. 2 is a composite, exploded, side elevational view of a combination molded, dry, initially non-tacky, expandable sealant and acoustic baffle component, as well as a side elevational view of a carrier for the molded component specifically configured to complementally fit within a cavity of the automobile body as depicted in FIG. 1;

FIG. 3 is a side elevational view of the component and carrier of FIG. 2 illustrated in assembled form; and FIG. 4 is a plan view of the component and carrier of FIG. 3, showing the assembly mounted on a panel of the automobile body which defines a part of a body cavity.

DETAILED DESCRIPTION OF THE PREFERRED EMBODIMENTS

The automobile body 10 of FIG. 1 includes several interconnected, hollow frame elements or pillars or rails that define an engine compartment 12, a passenger compartment 14, and a trunk area 16. As explained in U.S. Pat. No. 5,506,025, issued to the assignee hereof and incorporated herein by reference thereto, the upright pillars of body 10 surrounding the passenger compartment 12 are conventionally referred to by designations such as "A", "B", and "C", while the forward extending frame members 18 are designated as "engine rails." Similarly, the lower horizontally extending tubular components 20 of body 10 are usually identified as "rocker panel rails."

The present invention relates to an improved expansion temperature tolerant, dry, initially non-tacky, expandable sealant and acoustic baffle component which for example may be in the form of the molded component 22 as illustrated in FIGS. 2–4 of the drawings. Component 22 is configured to be complementally mounted on the carrier 24 which can be of various materials such as metal or nylon. The function of carrier 24 is to not only support the expandable molded component 22 in a selected body cavity of body 10 and to hold the component 22 in a predetermined position until it undergoes expansion when the automobile body 10 is conveyed through a conventional paint and/or primer bake oven making up a part of the automobile manufacturing process, but also to serve as a guide barrier to selectively control the expanded configuration of the expandable component within a particular cavity of body 10.

As best shown in FIG. 2, the specially configured carrier 10 for example may have a main plate section 26 joined to an upright extension 28 joined to plate section 26 by gusset 30. A clamp-mounting element 32 may be provided on plate 26 if desired for receiving a clamp 34, shown in dash lines, that facilitates securement of carrier 24, as well as the component 22 mounted thereon, to the wall structure 36 of automobile body 10. The plate 26 may include a plurality of barbs 38 or the like which are received in respective apertures 40 in the main body segment 42 of molded expandable component 22, for connecting component 22 to plate 26 of carrier 24. The molded component 22 in the exemplary instance of FIGS. 2–4 has an upright arm portion 44 which lays against and complementally engages the extension 28 of carrier 24.

It is to be understood in this respect that component 24 is preferably formed into a desired shape using an injection molding or equivalent technique to produce a self-sustaining body that upon expansion forms a foamed-in-place sealant and baffle barrier within a body cavity of body 10, as explained in detail in the '025 patent referenced above. The configuration of molded component 22 as depicted in the drawings is for illustrative purposes only and it is understood that the particular dimensions and configuration of each component 22 may be selectively varied to conform to the cross-sectional shape of the body cavity into which the expandable component 22 is to be positioned. The particular shape and size of the component 22 is also in most instances dictated by the sealing and baffle function to be performed component in its expanded form within a body cavity.

Although FIGS. 1–4 illustrate a moldable expandable baffle product especially configured to be mounted on a suitable relatively rigid carrier, it is to be understood that the present invention is not limited to expandable baffle products that are designed to be mounted on a complemental carrier. In certain applications, especially where the cavity passage is essentially horizontal in extent, a molded expandable baffle element may simply be strategically positioned in a desired location in that passage. Often times in these instances, the baffle product need not be located in an extremely precise position.

The moldable composition for preparation of an expandable component 22 of required physical and chemical properties preferably includes a quantity of a grafted anhydride polymer, and an amount of a polymer additive containing a terminal epoxide group which reacts with at least a part of the anhydride polymer when the component is heated to a temperature experienced by an automobile body cavity receiving the expandable component as the automobile body is conveyed through a conventional paint and/or primer bake oven forming a part of the automobile manufacturing operation. In addition, the moldable composition includes a suitable blowing agent which effects expansion of the component 22 molded from the composition, when that component is subjected to heat during baking of the automobile body in the bake oven. Desirably, the moldable composition also includes a tacifier which imparts tackiness to the outer surface of the dry, initially non-tacky, molded component 22 as it expands when subjected to bake oven heat. The grafted anhydride polymer present in the molded component 22, which functions somewhat in the manner of an adhesive when heated in the bake oven, increases the tackiness properties of the molded component 22 as it undergoes expansion.

Exemplary grafted anhydride polymers useful in preparing the improved composition of this invention include ethylene-vinyl acetate grafted with an acid anhydride functionally, ethylene-n-butyl acrylate grafted with an acid anhydride functionally, ethylene-octane copolymer grafted with an acid anhydride functionally, polyethylene grafted with an acid anhydride functionally, polypropylene grafted with an acid anhydride functionally, and ethylene-propylene rubber grafted with an acid anhydride functionally. A preferred acid anhydride in each instance is maleic anhydride. A preferred olefinic grafted polymer is ethylene-vinyl acetate grafted with maleic anhydride functionally. The grafted olefinic anhydride polymer is preferably present in the composition on a wt % basis of from about 10 to about 60.

A polymer additive containing a terminal epoxide group which is preferably selected from the group of solid Bisphenol A or F diglycidyl ether polymer (derived from Bisphenol A or Bisphenol F and epichlorohydrin) characterized by an epoxide equivalent>about 400, liquid Bisphenol A or F diglycidyl ether polymer (derived from Bisphenol A or Bisphenol F and epichlorohydrin) characterized by an epoxide equivalent of about 150 to about 220, adducts of dimer fatty acids with diglycidyether of Bisphenol A or Bisphenol F (Epikote or Epon 872), and adducts of epoxide terminated acrylonitrile-butadiene rubbers (CTBN, Hycar 1300×8, 1300×13). A preferred additive is Bisphenol A diglycidyl ether polymer. The epoxide terminated polymer additive is preferably present in the composition on a wt % basis of from about 1 to about 10.

The composition also is provided with a suitable blowing agent which is preferably selected from the group of a modified or unmodified azodicarbonamide, p,p'-oxybis (benzene-sulfonyl) hydrazide, p-toluene sulfonyl hydrazide, and dinitroso pentamethylene tertamine. The preferred blowing agent is an azodicarbonamide. The blowing agent is preferably present in the composition on a wt % basis of from about 1 to about 10.

The composition for preparing a dry, initially non-tacky, expandable sealant and acoustic baffle component which is more expansion temperature tolerant than prior expandable compositions may also include a filler polymer which is preferably selected from the group of ethylene-vinyl acetate, ethylene-n-butyl acrylate, ethylene-octane copolymer, polyethylene, polypropylene, and ethylene methacrylic acid copolymer. The preferred filler polymer is ethylene-vinyl acetate. The filler polymer when incorporated in the composition may be present on a wt % basis of from about 1 to about 50.

A rubber-like constituent may also be included in the composition for preparing the expandable component, which is preferably selected from the group of styrene-butadiene rubber, ethylene-propylene rubber, ethylene-propylene-diene rubber, butadiene rubber, styrene isoprene-styrene Block copolymer, styrene-butadiene-styrene Block copolymer, styrene-ethylene/butylene-styrene Block copolymer, styrene-ethylene/propylene Block copolymer, nitrile rubber, and chlorinated polyethylene. The preferred rubber-like constituent is styrene-butadiene rubber. The rubber-like constituent may be present in the composition on a wt % basis of from about 1 to about 15.

A molding and processing aid may be included in the composition and which is preferably selected from the group of paraffin wax, microcrystalline wax, polyethylene wax, polyamide wax, and natural wax. The preferred molding and processing aid when used in the composition is polyethylene wax. The amount of the molding and processing aid on a wt % basis may be from about 1 to about 15.

A tacifier for enhancing the tackiness of the expandable component following initiation of expansion thereof may be incorporated in the moldable composition. The tacifier when used is preferably selected from the group of aliphatic hydrocarbon resins, aromatic hydrocarbon resins, aliphatic/aromatic hydrocarbon resins, hydrogenated hydrocarbon resins, polyterpene resins, rosin ester resins, coumarone indene resins, α-methyl styrene resins, and polystyrene resins. The major proportion of the aliphatic hydrocarbon resins and of the aromatic hydrocarbon resins preferably are principally made up of $C_5$, $C_7$, and $C_9$ hydrocarbons in the case of the aliphatic hydrocarbon resins and equivalent hydrocarbons in the aromatic hydrocarbon resins. The amount of tacifier on a wt % basis may be from about 1 to about 15.

An inorganic or organic filler may be included in the composition in an amount ranging on a wt % basis from about 1 to about 20, and which preferably may be selected from the group of calcium carbonate, barium sulfate, silica, calcium sulfate, aluminum silicate, magnesium silicate, potassium aluminum silicate, calcium metasilicate, pumice, glass spheres, and organic fillers. The preferred filler is calcium carbonate. The amount of inorganic or organic filler on wt % basis may be from about 1 to about 20.

The composition for specific use in preparing an expandable sealant and baffle component meeting the requisite parameters of this invention may be prepared by introducing the individual constituents into a conventional continuously operable machine such as an extruding machine. Exemplary machines include single screw compounding equipment, reciprocating single screw extruding machines, and twin screw extruding machines. Extrusion equipment of this type conventionally includes from two to four inlets along the length thereof with the ratio of the length of the barrel to the diameter of the screw being in the range of about 7:1 to about 18:1. Preferably, all of the constituents of the composition except for the reactive agents, and including the blowing agent, are added at the first entrance port to the extruder. The reactive agents and the blowing agent are added at the third port of the extruder where the extruding equipment has four conventional entrance ports. The third port is normally about 50% to about 75% away from the first entrance port along the length of the extruder barrel. Residence time normally is in the range of from about 1–3 minutes with a nominal processing time being about 2 minutes.

The continuous extruder should be equipped with a knife capable of cutting the extrudate into a series of pellets. If desired, the extrudate exiting from the extruder can be subjected to a water bath to assure cooling thereof to a substantially solid form. Alternatively, the extrudate from the continuous extruder can be directed as a strand to a strand pelletizer and cut into small pellet cylinders.

The pellets from the extruder can then be molded into a composite, expandable sealant and baffle product in an injection molding machine, preferably at a temperature in the range of 80° C. to 100° C., and usually no more than about 120° C.

Although the improved expandable baffle component of this invention has been described particularly utility for use in the passage defining cavities of automobile bodies, it is to be understood that the expandable component offers advantages when used in other products that are subjected to manufacturing and/or processing applications which raise the temperature of that product. For example, many appliances have structural supporting members presenting passages which would benefit from incorporation of a sealant and baffle element in the structure defining the passages to prevent entrance into or passage through the passages of undesirable contaminants. Furthermore, many of these appliances have paint or coating materials applied which are dried and/or cured in a baking oven. Refrigerators are just one example of an appliance which advantageously could be provided with improved sealant and baffle components of this invention in certain supporting structures of the appliance.

| Expandable Baffle Composition | 1753B-16UUU Batch Process | 1753B-16VW Batch Process | 1753B-16ZZZ Batch Process | 1753B-16ZZZ Continuous Process | 1753B-16B3 Batch Process | 372Z-001B Continuous Process |
|---|---|---|---|---|---|---|
| Bynel CXA-E418 | 46.0% | 43.5% | 41.0% | 41.0% | 28.5% | 38.0% |
| Elvax 265 | 25.0% | 27.5% | 27.5% | 27.5% | 31.0% | 25.0% |
| SBR | | | 2.5% | 2.5% | 5.0% | 5.0% |
| Tyrin 2136P | 2.5% | 2.5% | 2.5% | 2.5% | | |
| Nevtac 100 | 10.0% | 7.5% | 7.5% | 7.5% | 7.5% | 5.0% |
| Microsere 5999 | 5.0% | 7.5% | 7.5% | 7.5% | 7.5% | |
| Marcus M200 | | | | | | 10.0% |
| Epon 1001F | | | | | 5.0% | |
| Arldite GT 9654 | | | | | | 7.5% |
| Celogen 765A | 8.0% | 8.0% | 8.0% | 8.0% | | |
| Unicell DL7SN | | | | | 9.0% | 6.5% |
| Unicell OH | 1.0% | 1.0% | 1.0% | 1.0% | | |
| Unicell GP3 | | | | | 1.5% | |
| ZnO | | | | | 0.4% | |
| Polar 9910 | 2.5% | 2.5% | 2.5% | 2.5% | | |
| Quincy White 325 | | | | | 4.6% | 3.0% |
| Total | 100.0% | 100.0% | 100.0% | 100.0% | 100.0% | 100.0% |
| Volume Expansion | | | | | | |
| 149° C. | High | High | High | Low | High | High |
| 163° C. | High | High | High | Low | High | High |
| 177° C. | High | High | High | Low | High | High |
| 191° C. | High | High | High | Low | High | High |
| Adhesion (163° C. cure)[1] | | | | | | |
| Initial | Good | Good | Good | Good | Good | Good |
| Heat Age | Fair | Fair | NT | NT | NT | Good |
| 250 Hours Humidity | Good | Good | NT | NT | NT | Good |
| 250 Hours Salt Spray | Good | Good | NT | NT | NT | Good |
| Flow during Cure (163° C.) | None | None | None | High | Slight | Slight |

[1]Substrates: Cold Rolled Steel, Hot Dipped Galvanized, Galvaneal, Electrodeposition-coated Steel, Phosphatized Steel
Bynel CXA-E418 - ethylene-vinyl acetate grafted with maleic anhydride functionally
Elvax 265 - ethylene-vinyl acetate
SBR - styrene-butadiene rubber
Tyrin 2136P - chlorinated polyethylene
Nevtac 100 - aliphatic hydrocarbon resin ($C_5$, $C_7$ and $C_9$)
Microsere 5999 - microcrystalline wax
Marcus M200 - polyethylene wax
Epon 1001F - Bisphenol A diglycidyl ether polymer
Arldite GT 9654 - Bisphenol A diglycidyl ether polymer
Celogen 765A - modified azodicarbonamide
Unicell DL75N - modified azodicarbonamide
Unicell OH - p,p'-oxybis(benzene-sulfonyl)hydrazide
Unicell GP3 - dinitroso pentamethylene tertamine
ZnO - zinc oxide
Polar 9910 - potassium-aluminum silicate
Quincy White 325 - calcium carbonate
Volume expansion - "High" - $<\approx 200\%$
"Low" - $>\approx 800\%$

What is claimed is:

1. A method of preparing a composition for forming an expansion temperature tolerant, dry, initially non-tacky, expandable sealant and acoustic baffle component for sealing an automobile body cavity and which is capable of undergoing expansion at a temperature experienced by the body cavity during oven curing of a coating material applied to the vehicle, including the steps of:

conveying an admixture of a quantity of a grafted anhydride polymer, an amount of a polymer additive containing a terminal epoxide group, and a sufficient quantity of a blowing agent capable of effecting expansion of the component composition when the component is heated to an elevated temperature, through a continuous mixing zone; and maintaining the admixture in said zone for a time period sufficient to effect reaction of at least a part of the epoxy with the grafted anhydride polymer.

2. The method of preparing a composition as set forth in claim 1, wherein is included the step of conveying the admixture through an auger-type continuous mixer.

3. The method of preparing a composition as set forth in claim 1, wherein is included the step of conveying the admixture through said continuous mixing zone under conditions causing the admixture to remain substantially at the temperature thereof at the time of introduction to the zone.

4. The method of preparing a composition as set forth in claim 1, wherein is included the step of conveying the admixture through said continuous mixing zone for a time period from about 1 to about 2 minutes.

* * * * *